United States Patent [19]

Diehl et al.

[11] 4,435,216

[45] Mar. 6, 1984

[54] PROCESS FOR THE ACCELERATED SOLIDIFICATION OF HYDRAULIC CEMENT MIXTURE

[75] Inventors: Manfred Diehl, Frankfurt; Roland Bergmann, Hanau, both of Fed. Rep. of Germany

[73] Assignee: Degussa Aktiengesellschaft, Frankfurt, Fed. Rep. of Germany

[21] Appl. No.: 406,524

[22] Filed: Aug. 9, 1982

[30] Foreign Application Priority Data

Aug. 20, 1981 [DE] Fed. Rep. of Germany ....... 3132928

[51] Int. Cl.³ .............................................. C04B 7/35
[52] U.S. Cl. ........................................ 106/97; 106/98; 106/315
[58] Field of Search ............................ 106/97, 315, 98

[56] References Cited

U.S. PATENT DOCUMENTS

| | | | |
|---|---|---|---|
| 4,073,867 | 2/1978 | Roebke et al. | 423/429 |
| 4,116,705 | 9/1978 | Chappell | 106/97 |
| 4,231,801 | 11/1980 | Dunton | 106/97 |
| 4,303,626 | 12/1981 | Strack et al. | 423/329 |
| 4,303,628 | 12/1981 | Strack et al. | 423/329 |
| 4,303,629 | 12/1981 | Strack et al. | 423/329 |
| 4,305,916 | 12/1981 | Strack et al. | 423/329 |

FOREIGN PATENT DOCUMENTS

| | | | |
|---|---|---|---|
| 1963375 | 6/1971 | Fed. Rep. of Germany | 423/329 |
| 2053308 | 5/1927 | Fed. Rep. of Germany | 423/329 |
| 2447021 | 5/1976 | Fed. Rep. of Germany | 423/329 |
| 2651419 | 5/1978 | Fed. Rep. of Germany | 423/329 |
| 2651420 | 5/1978 | Fed. Rep. of Germany | 423/329 |
| 2651436 | 5/1978 | Fed. Rep. of Germany | 423/329 |
| 2651437 | 5/1978 | Fed. Rep. of Germany | 423/329 |
| 2651445 | 5/1978 | Fed. Rep. of Germany | 423/329 |
| 2651485 | 5/1978 | Fed. Rep. of Germany | 423/329 |
| 2517218 | 10/1978 | Fed. Rep. of Germany | 423/329 |
| 1498369 | 9/1967 | France | 106/90 |

OTHER PUBLICATIONS

Chem. Abst. 70, p. 90486, 1969.

*Primary Examiner*—James Poer
*Attorney, Agent, or Firm*—Cushman, Darby & Cushman

[57] ABSTRACT

The solidification of hydraulic cement mixtures can be accelerated by addition of crystalline zeolites. Preferably, there are employed zeolites of Types A, X, and P.

14 Claims, No Drawings

PROCESS FOR THE ACCELERATED SOLIDIFICATION OF HYDRAULIC CEMENT MIXTURE

BACKGROUND OF THE INVENTION

The invention is directed to a process for acceleration of the solidification of hydraulic cement mixtures by addition of crystalline zeolites and to the compositions obtained.

Solidification accelerators lead to a definite acceleration of the solidification of cement mixtures from hydraulic binders and aggregates of various types. The accelerating effect of the additive is, e.g., particularly in demand with sprayed concrete, in the sealing of water breaks and in the employment of anchor iron.

Additives of this type for cement bonded building materials accordingly are of economical and industrial interest.

It is already known to use calcium chloride as an additive for the accelerated solidification of hydraulic cements. However, this additive leads to stronger "creeps" of concrete and in dangerous manner promotes the corrosion of metal reinforcement. Therefore, the employment of calcium chloride as well as the other chlorides is forbidden in Germany.

Furthermore, it is known to use other calcium salts such as calcium thiosulfate (K. Murakami et al Yogyo Kyokai Shi 1968, 76, 373–383, Chem. Abst. 70 (1969) 90486), calcium sulfamate (German OS No. 2053308), and calcium nitrite (French Pat. No. 1498369) in hydraulically hardening cement mixtures. Other organic and inorganic materials, because of their limited effectiveness, have until now only been of moderate interest.

Calcium formate has also been proposed repeatedly as setting and solidification accelerator for hydraulic cement mixtures (German OS No. 1963375 and German AS No. 1232861). However, because this material, above all at too high dosage, causes too quick a solidification of the cement mixtures, and because its accelerating effect is confined to the early phase of the setting process, the practical use of calcium formate has remained limited.

Calcium thiocyanate likewise is available for its accelerating effect with hydraulic cement mixtures. In comparison to calcium formate, there is even less danger of too quick solidification. Besides, with calcium thiocyanate there is also attained a noticeable acceleration of hardening. However, calcium thiocyanate is not suited for a wide use in cement mixtures because its strong hydroscopicity impairs its ability to be handled and consequently excludes mixing into dry cement. Furthermore, at high amounts of addition there is the danger of corrosion of the concrete reinforcements. Not the least is the fact that with extensive use it is very expensive because of the high amount added.

Furthermore, it is known to add water insoluble activated silicas or silica containing materials to hydraulically hardening cement mixtures to produce water and oil permeable concrete structural parts. Thereby, there has not been detected an accelerated solidification (German Pat. No. 1646437).

Trialuminum phosphate have an $Al_2O_3:P_2O_5$ ratio of 1:1 in lower amounts of addition up to about 1 percent acts as a setting retarder, while at higher amounts it acts as an accelerator. The narrow limits of activity require an exact maintenance of the prescribed amounts. However, in practice this frequently leads to difficulties.

Therefore, it was the problem of the invention to find an additive which has good accelerating effect but not the disadvantages of the previously mentioned materials.

SUMMARY OF THE INVENTION

It has now been found that the use of crystalline, powdery zeolites leads to acceleration of solidification in hydraulic cement mixtures.

The subject matter of the invention is a process for the acceleration of solidification of hydraulic cement mixtures characterized by adding 0.2 to 10 weight % of a powdery, crystalline zeolite, based on the total mixture. The invention also includes the composition.

In a preferred form of the process, there can be employed a powdery zeolite A which has been produced according to German OS No. 2447021 filed Dec. 23, 1981, and related Roebke U.S. application Ser. No. 121,482, filed Feb. 14, 1980 and now abandoned in favor of application Ser. No. 223,743, filed Jan. 9, 1981 and now abandoned in favor of application Ser. No. 269,253, filed June 1, 1981 and now abandoned in favor of application Ser. No. 471,898, filed Mar. 3, 1983, German OS No. 25 17 218 and related Roebke U.S. Pat. No. 4,073,867, German OS No. 26 51 419 and related Strack U.S. Pat. No. 4,303,628, German OS No. 26 51 420 and related Strack U.S. Pat. No. 4,303,626, German OS No. 26 51 436 and related Strack U.S. Pat. No. 4,305,916, German OS No. 26 51 437 and related Strack U.S. Pat. No. 4,303,627, German OS No. 26 51 445, German OS No. 26 51 485 and related U. S. Pat. No. 4,303,629 and which have the particle size distribution stated there. The entire disclosures of the cited Roebke U.S. application and U.S. patent and of the cited Strack U.S. patents are hereby incorporated by reference and relied upon. Similarly, the entire disclosure of German OS No. 26 51 445 is incorporated by reference and relied upon.

The accelerating effect of this additive is not limited only to the early phase of the setting process. Besides, the process has the advantage that zeolites of Type A are easily handled and also the addition of large amounts still is not expensive.

The additive can be added to the cement previously or to the hydraulic cement mixture during the mixing. In additional preferred forms in the same manner there can also be employed zeolites of Types P and X. In all cases, there has been found that at the same time the final strength of the hardened mixture either remains the same or is even increased.

The zeolites, e.g., of types A, X, and P can also be made as shown in Breck "Zeolite Molecular Sieves" (1974), e.g., pages 83–90, 726–730, 733, 735, 743, and 747–752 for zeolite A, pages 72–74, 266–267, 270, 273–276, 289–293, and for zeolite P and pages 85, 92, 95, 727–740, and 748 for zeolite X. The entire disclosure of Breck is hereby incorporated by reference and relied upon with emphasis on the pages mentioned above.

Unless otherwise indicated, all parts and percentages are by weight.

The composition can comprise, consist essentially of, or consist of the materials set forth; and the process can comprise, consist essentially of, or consist of the recited steps.

The invention is explained in connection with the following examples.

DETAILED DESCRIPTION

As a measure of the solidification of the cement mixtures being examined, there serves the depth of penetration of a probe body which is determined with an SNR Penetrometer PNR 6. The depth of penetration is measured after two and four hours using a measuring body weighing 13 grams, after six hours with a measuring body weighing 31.7 grams, since after six hours with the lighter measuring body there no longer can be ascertained a suitable depth of penetration.

In the tables in each case, there is given the percent change of the test mixtures with zeolite compared to the comparison mixture without zeolite.

The comparison mixture consisted of 50 grams of cement, 150 grams of sand, and 50 grams of water. With addition of powdery, crystalline zeolite, the sand weighed was reduced by the same amount in order to hold constant the solid portion of the samples.

Correspondingly in the experiments, the water content of the zeolite added was considered and a correspondingly lesser amount of water added. There did not occur a change in viscosity after the addition of zeolite.

There likewise was not found a deterioration of other properties of the concrete, e.g., tensile strength, because of the mixing in of crystalline zeolite. In part, there frequently occurred an improvement.

The results of the examples of the invention are found in Tables 1 and 2. There were used a zeolite of Type A produced according to German OS No. 2651485 and related Strack U.S. Pat. No. 4,303,629 and which had the particle size distribution noted therein and zeolites of Types X and P.

The results from Table 1 show clearly the reducing depth of penetration with increasing zeolite content at the same setting time and therewith the effectiveness of zeolite A as setting accelerator.

TABLE 1

| Weight % Zeolite Type A | 2 h (13g) | 4 h (13g) | 6 h (31.7g) |
| --- | --- | --- | --- |
| 0.2 | 4.3 | 54.6 | 10.3 |
| 0.5 | 14.4 | 54.9 | 21.4 |
| 1.0 | 15.5 | 67.8 | 32.5 |
| 5.0 | 63.9 | 71.7 | 62.4 |
| 10.0 | 80.1 | 91.0 | 83 |

Table 1 depth of penetration (percent change after different setting times).

Table 2 shows the effectiveness of zeolites of Types X and P as setting accelerator.

TABLE 2

| | Weight % Zeolite | 2 h (13g) | 4 h (13g) | 6 h (31.7g) |
| --- | --- | --- | --- | --- |
| Zeolite X | 1 | 9 | 2.4 | 6.8 |
| Zeolite P | 1 | 19 | 11.1 | 30.3 |

Depth of penetration (percent change) after different setting times.

Table 3 shows the load of the hardened cement mixtures with and without addition of zeolite.

TABLE 3

| | Load (kg) |
| --- | --- |
| Comparison Without Zeolite | 36 |
| 1 Wt.-% Zeolite X | 49 |
| 1 Wt.-% Zeolite P | 70 |
| 1 Wt.-% Zeolite A | 57 |

The entire disclosure of German priority application P 3132928.4 is hereby incorporated by reference.

What is claimed is:

1. A hydraulic cement mixture having an accelerated solidification time containing 0.2 to 10 weight % of powdery, crystalline zeolite based on the entire mixture, the zeolite being Type A, zeolite Type X or zeolite Type P.

2. A mixture according to claim 1 wherein the zeolite is of Type A.

3. A mixture according to claim 1 wherein the zeolite of of Type X.

4. A mixture according to claim 1 wherein the zeolite is of Type P.

5. A process for the accelerated setting of a hydraulic cement mixture comprising allowing the mixture of claim 1 to set in the presence of water.

6. A process for the accelerated setting of a hydraulic cement mixture comprising allowing the mixture of claim 2 to set in the presence of water.

7. A process for the accelerated setting of a hydraulic cement mixture comprising allowing the mixture of claim 3 to set in the presence of water.

8. A process for the accelerated setting of a hydraulic cement mixture comprising allowing the mixture of claim 4 to set in the presence of water.

9. A hardened hydraulic cement made by the process of claim 5.

10. A hardened hydraulic cement made by the process of claim 6.

11. A hardened hydraulic cement made by the process of claim 7.

12. A hardened hydraulic cement made by the process of claim 8.

13. A mixture according to claim 1 consisting essentially of cement, sand, water, and said crystalline zeolite.

14. A mixture according to claim 13 consisting of cement, sand, water, and said zeolite.

* * * * *